(No Model.)
J. P. THURMAN.
CUTTER HEAD.
No. 396,626. Patented Jan. 22, 1889.
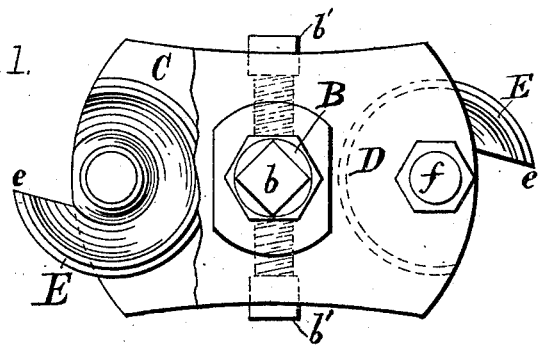
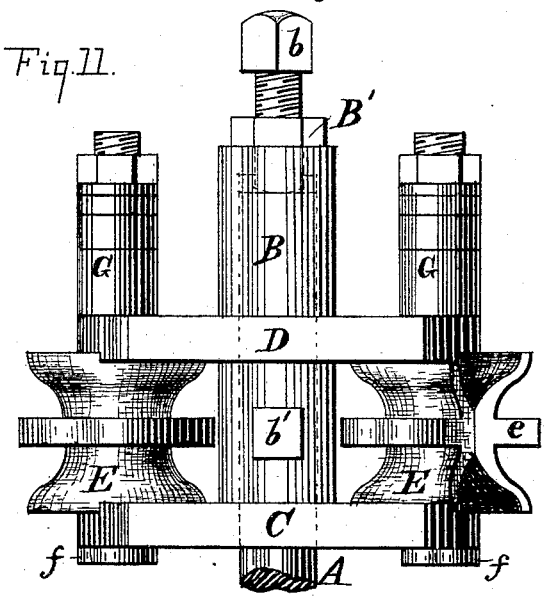
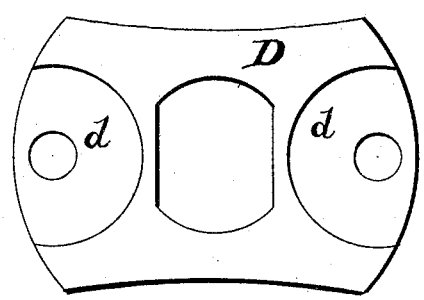
Witnesses.
T. Burroughs
G. V. Chandler.
Inventor.
James P. Thurman
By W. H. Chandler
Attorney.

United States Patent Office.

JAMES P. THURMAN, OF ATLANTA, GEORGIA, ASSIGNOR OF ONE-HALF TO JOHN T. THURMAN, OF SAME PLACE.

CUTTER-HEAD.

SPECIFICATION forming part of Letters Patent No. 396,626, dated January 22, 1889.

Application filed February 17, 1888. Serial No. 264,440. (No model.)

*To all whom it may concern:*

Be it known that I, JAMES P. THURMAN, a citizen of the United States, residing at Atlanta, in the county of Fulton and State of Georgia, have invented a new and useful Cutter-Head; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to the class of cutter-heads that are used for shaping the edges of boards or for sticking or matching the same, the object being to simplify the construction and make them more substantial and easily managed.

It consists of cutters and means of attaching them to a flanged sleeve, the particulars of which will be hereinafter set forth.

In the accompanying drawings, Figure I is a top view or plan of the device with a portion of the cap broken away to show the top side of the left-hand cutter. Fig. II is a side view or elevation showing all of the details. Fig. III is a view of the under side of the cap, showing the circular recesses into which the cutters fit.

So far as relates to the recesses for the knives, the construction of the flange on the sleeve is the same as that of the cap shown in Fig. III.

In the several figures, like reference-marks indicating corresponding parts, A is the mandrel of a shaping-machine.

B is a sleeve having a flange, C, at its bottom end and a plug, B', in its top end.

*b* is the adjusting-screw, and *b'* are the set-screws by which it is fastened to the mandrel A.

The cutters E are circular, as seen in Fig. I, except such a portion as is cut away to form the cutting-edge *e*, and are of such form, as seen in profile in Fig. II, as is commonly used for grooving and molding the edges of the stiles and rails and mullions of doors. The form of the cutter, however, as shown in Fig. II, may be changed to adapt it to different kinds of work.

The flange C and the cap D have circular recesses *d*, (best shown in Fig. III,) in which the ends of the cylindrical cutters fit. The cap D is adapted to slide readily on the sleeve B, and has holes for the bolts *f*, as have also the flange C and the cutters E. The bolts *f* clamp the cutters firmly between the flange C and the cap D. Washers G are provided for the bolts, of such thickness and in such numbers as will permit the bolts to clamp cutters of various thickness without the necessity of running the nuts more than a short distance on the bolts.

The bolt-holes are central to the circular portion of the cutters to allow the cutters to be revolved as they are worn away, the sharpening being done on the face that is nearly radial in order to preserve the form of the cutting-edge. The knives are revolved on these bolts as far as may be necessary to make them cut properly and both to the same depth. If by accident or oversight the knives are not set out equally, it would not cause a deformity in the work, as either knife would perform the whole operation.

It is obvious that the cutters may be revolved to bring the cutting-edges to the proper positions as they are worn away, as above described. The diameter of the ends of the knives should be such as will fit the recesses in the flange and cap, and the diameter of the other parts of the knives must be made such as is required to produce the desired form in the work.

When the cutter-head is to be used on a sticking or other machine in which the work is adjustably held, the plug B' and the screws *b'* may be removed and the head be clamped on the shaft in the usual way.

I am aware that cutter-heads have been constructed which were adjustable vertically upon their mandrels, and in which the cutters were held in place by being clamped between two disks, and do not, therefore, broadly claim such a construction.

Having thus described my invention, what I claim as new, and desire to secure by Letters Patent of the United States, is—

A cutter-head consisting of the mandrel A, sleeve B, and flanges C and D, in combination with the cutters $e$, secured to said flanges by means of bolts $f$, passing through the centers of said cutter and the flanges, and provided with washers G, substantially as shown and described.

In testimony whereof I affix my signature in presence of two witnesses.

J. P. THURMAN.

Witnesses:
A. P. WOOD,
ALBERT A. WOOD.